Nov. 20, 1934.  F. BRANDT  1,981,304
ROD OR PIPE CLAMP
Filed Jan. 8, 1927  3 Sheets-Sheet 3

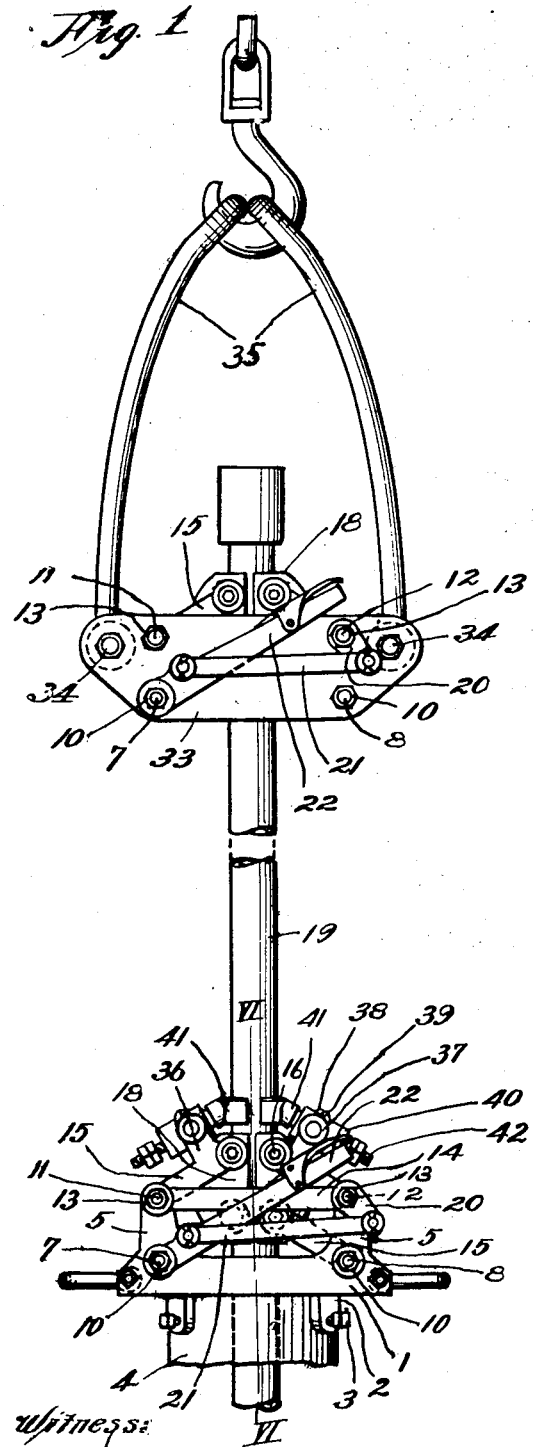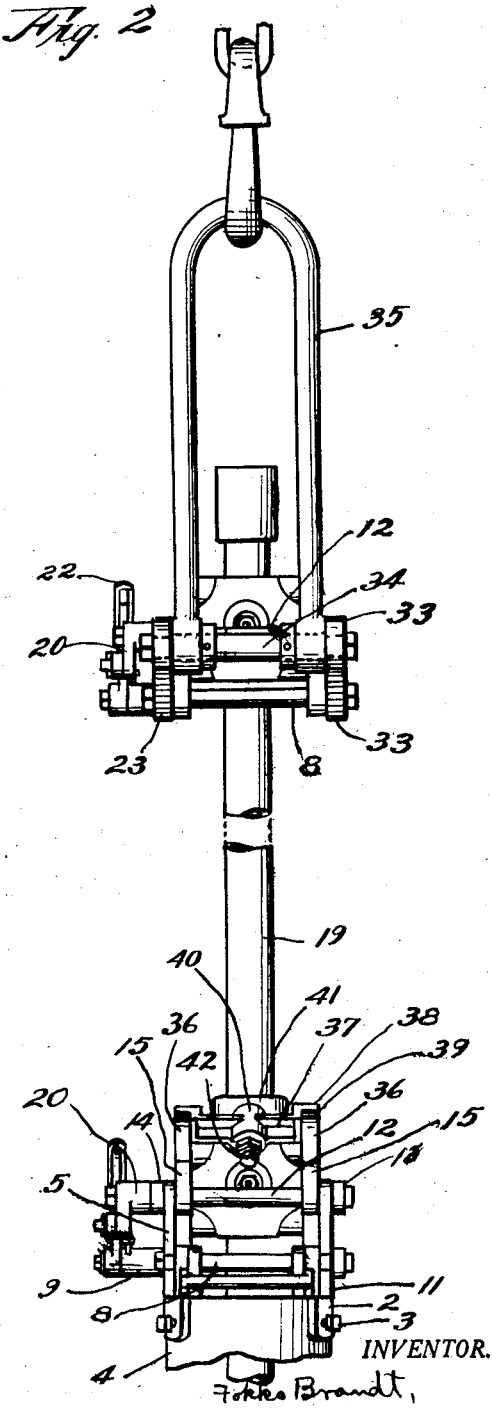

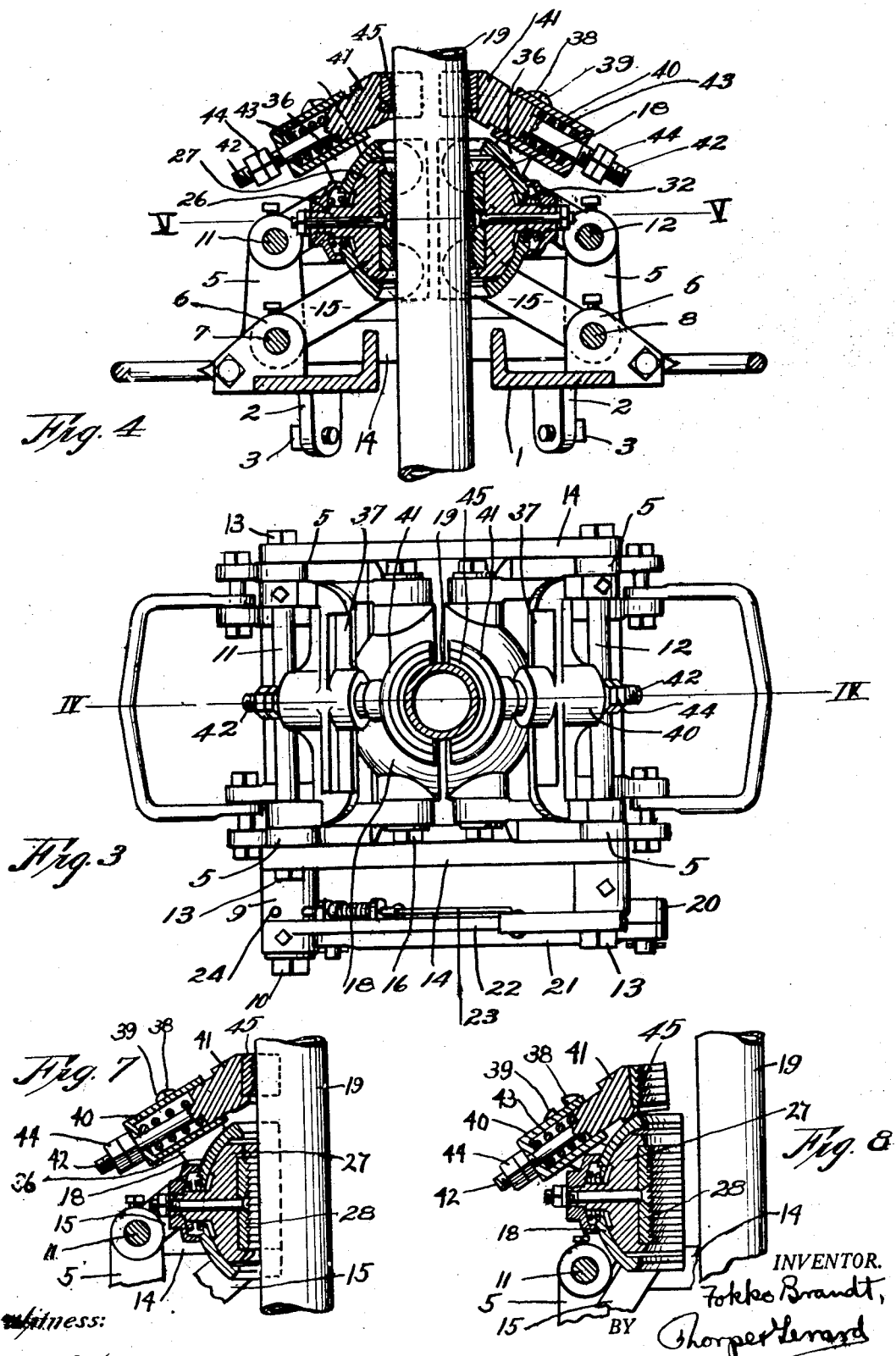

INVENTOR.
Fokko Brandt,
BY
ATTORNEYS.

Patented Nov. 20, 1934

1,981,304

UNITED STATES PATENT OFFICE 1,981,304

ROD OR PIPE CLAMP

Fokko Brandt, Kansas City, Mo.

Application January 8, 1927, Serial No. 159,788

10 Claims. (Cl. 24—249)

This invention relates to oil well casing elevating and holding apparatus and is devised as an improvement and reorganization of the holding apparatus shown in my United States Letters Patent No. 1,372,005, March 22, 1921, to make it adaptable for use in connection with earth boring or well drilling. The cam operated jaw mechanism shown in said patent cannot readily be made of sufficient size for well drilling purposes without unduly increasing its dimensions and weight, if it is desired to entirely throw the pivoted holding jaws away from the upwardly moving casing. The prime object of the invention is to employ toothed jaws for utilizing the gravitative force of the casing and auxiliary jaws to insure a firm and unyielding application of the latter to the casing and a lever rather than a cam to effect the disengagement of the jaws from the casing, the apparatus comprising a spider to hold and an elevator to lift the casing, corresponding to the relationship of the two sets of jaws shown in my patent above cited.

The objects of the invention are to provide mechanism whereby the jaw heads are maintained in vertical parallel relation by the mechanism which forms the operative support for said jaws, and to provide independently adjustable jaws to accommodate the casing whether vertical or slightly inclined, and to bring all of their teeth to bear on the casing should the latter be slightly worn to tapering form at any one or more points.

A further object is to provide the spider element of the apparatus with auxiliary jaws for loosely engaging the casing and holding the main jaws completely free thereof as the casing is raised by the elevator, as distinguished from apparatus in which a lever must be utilized to withdraw the main jaws from the casing.

With the general objects named in view, the invention consists in certain novel and useful features of construction and combinations of parts as hereinafter described and claimed; and in order that it may be fully understood, reference is to be had to the accompanying drawings, in which:—

Figure 1 is a side elevation of an elevator and spider embodying the invention as they will appear in operation.

Figure 2 is a view similar to Figure 1 but at right angles thereto.

Figure 3 is a top plan view of the spider in operative relation to a casing.

Figure 4 is a section on the line IV—IV of Figure 3.

Figures 7 and 8 are broken sections to indicate the operation of the auxiliary jaws from inoperative to operative positions.

Figure 5:
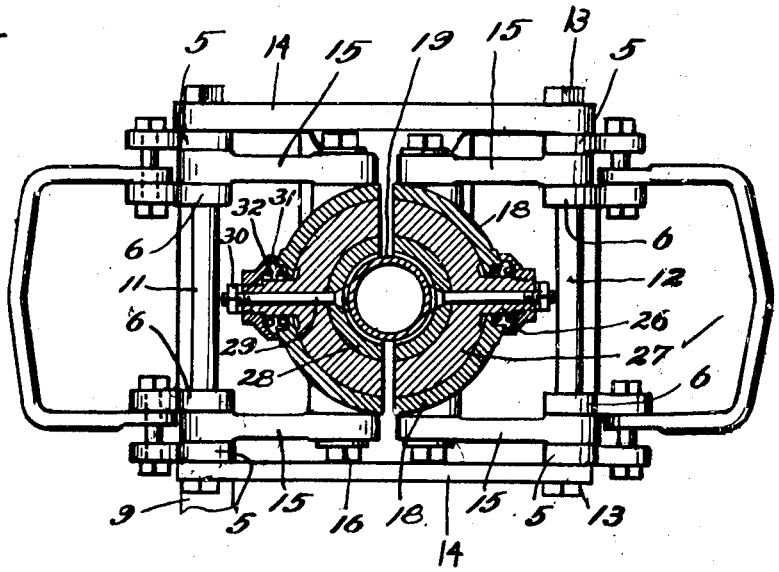
Figure 5 is a section on the line V—V of Figure 4.
Figure 6:
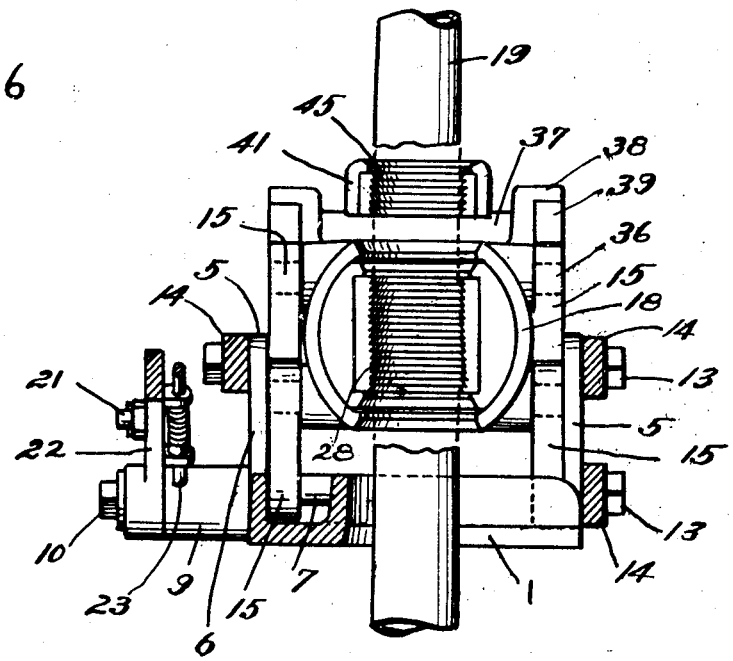
Figure 6 is a section on the line VI—VI of Figure 1.

In the said drawings, where like reference characters identify corresponding parts in all of the figures, 1 indicates a U-shaped spider of sufficient size to receive the largest diameter of casing for which the device is intended, said spider is formed with a series of depending lugs 2 carrying set screws 3 for the centering of the spider on a support or standard 4 with respect to the casing to be pulled or lowered into a well. The U-shaped spider is formed on its opposite sides with four upstanding lugs 5, and also formed integral with said spider and spaced slightly therefrom are four lugs 6 of less height than the lugs 5.

Extending through the lugs 5 and 6 are a pair of transverse shafts 7 and 8, one end of the shaft 7 being of sufficient length to extend through a tubular bushing portion 9 formed integrally with and projecting from one of the lugs 5, and said shafts are secured by cap screws 10 to prevent them from slipping in either direction. The lugs 5 adjacent their upper ends and vertically above the shafts 7 and 8 respectively, carry a second pair of shafts 11 and 12, which are held in place by cap screws 13. The shaft 12 at one end extends some distance beyond the lugs 5 and terminates in substantially the same vertical plane as the end of shaft 7 projecting through the bushing 9. On the side of the spider opposite from the mouth of its bifurcation, the lugs 5 are braced by a horizontal strap 14 engaged at its opposite ends with the shafts 11 and 12, and on the side corresponding with the bifurcation both the shafts 7 and 8 and the shafts 11 and 12 are provided with horizontal brace straps 14.

Rigidly secured at their outer ends to the shafts 7, 8, 11 and 12 are eight similar operating lever arms 15, pivotally engaging at their opposite ends with suitable bolts 16 carried by clamping jaws 18, the proportion of the parts being such that the clamping jaws are always above the horizontal axis of the spider, strain tending to spread the supporting shafts farther apart, thus leading to a clamping action by the jaws on the interposed casing 19. It will be apparent from a consideration of the drawings, that after the jaws have been sufficiently opened to receive a casing, that they will press against the casing when same is moving upwardly with the gravitative force of the weight of said jaws unless restrained by suitable means, and that with the jaws in contact with the casing, if the casing commences to move downwardly the jaws will exert a clamping pressure in proportion to the weight imposed.

In order to provide means for elevating the jaws away from contact with the casing, the projecting end of the shaft 12 extends through and is secured to one end of a lever arm 20, the other end of said lever arm being connected by a link 21 to a manually operable lever 22 pinned, keyed or otherwise rigidly secured to the projecting end of the shaft 7. The lever 22 is equipped with a detent member 23 for reception within a socket 24 formed in the projecting tubular bushing portion 9 of the spider. It will be evident that with the lever and parts in the position shown in Figure 1, the jaws unless restrained will be exerting a pressure on the casing in proportion to the gravitative force of the weight of said jaws. When the lever is pulled to the left from the position shown in Figure 1, and its detent 23 engaged in the socket 24 in the tubular bushing portion 9 (see Figure 3), the shafts 7, 8, 11 and 12 will be rotated to effect oscillation of the series of arms 15 and the consequent withdrawal of the clamping jaws 18 from the casing 19.

The clamping jaws 18 comprise substantially semi-spherical shaped housings, each housing being formed with large axial openings for the reception of a tubular stem 26 integrally formed on substantially semi-spherical slip carriers or gripping members 27. The faces of the slip carriers or gripping members 27 are recessed for reception of removable hardened toothed slips 28, and said slips and slip carriers are held in position by bolts 29 extending through the stem of the carriers and at their extremities provided with nuts 30 which maintain substantially semi-spherical washers 31 in position, against the housing. The carriers are held pressed against the inner faces of the housings under the force of expansion springs 32 inserted between the rear outer faces of the housing and the washers 31 as shown in Figure 4. With this construction, it being noted that the margins of the housings around the openings through which the stems project are cut away, it will be apparent that the slips and slip carriers may oscillate universally within the housings, the openings in the housings allowing such oscillation, the carriers 27 pressing internally and the washers 31 externally, against the housings, in order to accommodate the axis of the casing should the string of casing be pulled to one side of the vertical. In this connection it is to be remarked that the adjustable slips of the invention are also highly important when a casing of slighly tapering form, or a casing which has been mutilated and caused to assume an irregular form, is being pulled, as under such conditions, it will be evident that the universally adjustable slips will accommodate themselves to the taper and will always insure that the full biting edge or face of the slips are engaged with the casing.

The construction above described in connection with the spider applies equally in all respects to the elevator, except that in the elevator the U-shaped base member is not employed. In place of a series of lugs 5 carrying the shafts 7, 8, 11 and 12, a pair of transverse frame members 33 are utilized which carry said shafts. The ends of the frame members 33 carry a pair of similar shafts 34 to which the ends of suitable bails 35 are pivotally attached.

The practice of permitting the heavy jaws to drag on the casing leads to quick deterioration of the slips and greatly hinders the work of elevating the string, but also is dangerous as the slips rapidly become dull and consequently in an emergency are liable to fail and permit a string of casing to fall.

In order to obviate the continual dragging of the jaws and their consequent loss of edge, and also to lessen a possible practice of leaving the jaws open and depending on the quickness of the operator to throw the lever should the casing string commence to fall, I have formed each of the arms 15 of the upper set with extensions 36, and pivoted adjacent the upper ends between each of said pair of extensions is a bracket 37, the ends of the extensions and the brackets being respectively provided with cooperating stop lugs 38 and 39 for a purpose which will hereinafter appear.

The brackets 37 are formed midway their length with housings 40 forming carriers for auxiliary clamping jaws hereinafter detailed which are adapted to continuously press against the casing being drawn with a force equal to the gravitative force of the main or principal clamping jaws. This construction is desirable as the auxiliary jaws may be of small area and easier and cheaper to replace and also preserve the main jaws against wear and thus prolong the life of the biting face of the main slips. Slidingly received within the open end of the housings 40 are slip carrier members 41 having stems 42 extending through the bottom of the housing expansion springs 43 of sufficient strength to counterbalance the weight of the main jaws being interposed between said carriers 41 and the bottoms of the housings 40, the distance the springs may project the carriers being regulated by nuts 44 on the exposed ends of the carrier stems. Removably secured in any suitable manner to the face of the slip carriers 41 are suitable hardened toothed slips 45.

When the manually operable control lever 22 is thrown to the opposite direction from that shown in Figure 1, the main jaws 18 and consequently the auxiliary jaws 41 are moved away from the oil well casing 19. With the device in its inoperative position as mentioned, the springs 43 will expand and will project the auxiliary jaws 41 until stopped through contact of the nuts 44 against the outside face of the housing 40. With the parts in this position, it will be apparent that as the preponderating weight of the auxiliary jaw assembly is in the jaw itself, the brackets 37 will pivot around their centers on the extensions 36 and the stop lugs 38 on the bracket 37 will draw away from the stop lugs 39 on the extensions 36.

When it is desired to engage the device with a casing to be pulled, the lever 22 is swung to the position shown in Figure 1. This action effects a pivoting of the entire assembly around the shafts 7, 8, 11 and 12, but as the auxiliary jaws 41 are projected by the springs 43 they will first contact with the oil well casing 19. The auxiliary jaws, however, will not recede within the sockets 40 on account of the fact that the tension of the springs 43 is greater than the gravitative effect of the main jaw assembly. The auxiliary jaws 41 therefore are maintained in continuous contact with the casing 19 while the latter is moving upwardly, with a yielding force equivalent to the weight of the main jaws. In this connection it will be noted that the primary objects of lugs 38 and 39 is to provide means to prevent the pivoting or swinging movements of the auxiliary jaws beyond a predetermined point due to the contact of said lugs.

Should the casing slip or should it purposely be permitted to move downwardly, the auxiliary jaws 41 immediately grip the casing and the tendency of the downward movement of the casing is to swing the jaws 41 around the axes, the centers of the brackets 37, and simultaneously with such effect, the jaws 41 by the imposition of the downward movement of the casing are forced back within their housings 40 against the action of the springs 43. The auxiliary jaws will continue their rotation until their brackets contact with the main jaw, continued downward movement of the casing effecting a pivoting of the entire assembly around shafts 7, 8, 11 and 12, and thus leads to clamping engagement of the main jaws with the casing as aforementioned. The load thus being removed from the auxiliary jaws they are free to move upwardly to substantially the positions shown in Figure 4.

As soon as the casing again starts to travel in an upward direction, the action of the parts is reversed until the jaws assume their normal positions with the auxiliary clamping jaws only in contact with the casing.

From the above description, it will be apparent that while I have described and claimed the preferred embodiment of the invention it is to be understood that I reserve the right to make all changes properly falling within the spirit and scope of the appended claims.

What I claim is:

1. A gripping device comprising a frame, a pair of jaws pivotally mounted on said frame, a pair of spring-actuated auxiliary jaws carried by said first named jaws, and means for swinging said jaws toward and from the axis of the frame.

2. A gripping device comprising a frame, a pair of jaws pivotally mounted on said frame, a pair of auxiliary jaws carried by said first named jaws, and means for maintaining said auxiliary jaws in contact with and the main jaws out of contact with the structure being operated upon.

3. A gripping device comprising a frame member, a clamp jaw associated with said frame member, means carried by the frame member for co-operating with the jaw for gripping a pipe, connections between the clamp jaw and frame member for permitting the jaw to move toward and from the said cooperating means; said clamp jaw comprising a housing, and a gripping member carried by said housing and having universal movement thereon.

4. A gripping device comprising a frame member, a clamp jaw associated with said frame member, means carried by the frame member for cooperating with the jaw for gripping a pipe, connections between the clamp jaw and frame member for permitting the jaw to move toward and from the said cooperating means; said clamp jaw comprising a substantially semi-spherical shaped housing, and a gripping member fitted in said housing and having limited universal movement with respect thereto.

5. A gripping device comprising a frame member, a clamp jaw associated with said frame member, means carried by the frame member for co-operating with the jaw for gripping a pipe, connections between the clamp jaw and frame member for permitting the jaw to move toward and from the said cooperating means; said clamp jaw comprising a substantially semi-spherical shaped housing, a gripping member fitted in said housing and having limited universal movement with respect thereto, and resilient means for maintaining the housing and gripping member in close contact.

6. A gripping device comprising a frame member, a clamp jaw associated with said frame member, means carried by the frame member for co-operating with the jaw for gripping a pipe, connections between the clamp jaw and frame member for permitting the jaw to move toward and from the said cooperating means; said clamp jaw comprising a substantially semi-spherical shaped housing, a gripping member axially rotatable in said housing and having a stem projecting therethrough, retaining means on the end of said stem, and resilient means between said retaining means and the housing to maintain the housing and the gripping member tightly pressed together.

7. A gripping device comprising a frame, two pairs of complementary shafts journaled on said frame, a manually operable lever secured to one shaft of one of said pair of shafts, a link connecting said lever with one shaft of the other pair of shafts, arms rigidly carried by said shafts, and a pair of complementary jaws respectively carried by the arms of said two pairs of shafts.

8. A gripping device comprising a frame, two pairs of complementary shafts journaled on said frame, a manually operable lever secured to one shaft of one of said pair of shafts, a link connecting said lever with one shaft of the other pair of shafts, arms rigidly carried by said shafts, a pair of complementary jaws respectively carried by the arms of said two pairs of shafts, and locking means to hold the lever with the jaws in retracted position.

9. A gripping device comprising a frame, a pair of jaws pivotally mounted in said frame, said jaws being adapted to clamp a member against movement in one direction and being normally out of contact with such member to be clamped, and means connected to said jaws and normally in constant contact with the member to be clamped, said means being inoperative as long as such member moves in one direction but effecting movement of the jaws into clamping position upon movement of the member in the reverse direction.

10. A gripping device comprising a frame, a clamping jaw mounted in said frame and having a tendency to gravitate into contact with a member to be clamped, an auxiliary jaw cooperatively related with the clamping jaw and formed to engage and support a member to be clamped at any point throughout the length of such member, resilient means coacting with said jaws to normally permit the auxiliary jaw to constantly contact with the member to be clamped and to overcome the gravitative tendency of the clamping jaw to contact the member to be clamped, and a manually operable lever mounted in the frame and connected to the clamping jaw whereby the latter may be moved into member-clamping position against the resistance of said resilient means.

FOKKO BRANDT.